(12) United States Patent
Hausler et al.

(10) Patent No.: US 7,984,652 B2
(45) Date of Patent: Jul. 26, 2011

(54) CLAD INDUSTRIAL PROCESS TRANSMITTER HOUSING WITH CHASSIS

(75) Inventors: George Charles Hausler, Maple Grove, MN (US); Nicholas John Haywood, Brooklyn Park, MN (US)

(73) Assignee: Rosemount Inc., Eden Prairie, MN (US)

( * ) Notice: Subject to any disclaimer, the term of this patent is extended or adjusted under 35 U.S.C. 154(b) by 184 days.

(21) Appl. No.: 12/555,517

(22) Filed: Sep. 8, 2009

(65) Prior Publication Data

US 2011/0058313 A1 Mar. 10, 2011

(51) Int. Cl.
*G01L 7/00* (2006.01)
(52) U.S. Cl. .......................................................... 73/756
(58) Field of Classification Search ......................... None
See application file for complete search history.

(56) References Cited

U.S. PATENT DOCUMENTS

| | | | |
|---|---|---|---|
| 4,645,965 | A | 2/1987 | Paganelli |
| 2009/0084734 | A1 | 4/2009 | Yencho |

FOREIGN PATENT DOCUMENTS

| | | | |
|---|---|---|---|
| EP | 0774652 | A2 | 5/1997 |
| EP | 0919796 | A1 | 6/1999 |
| WO | WO02/35197 | A2 | 5/2001 |

OTHER PUBLICATIONS

Zhejiang Yongkang Huachuan Electric Appliances Co., Ltd., "Stainless steel coffee mug Manufacturer exporting direct from Zhejiang" from http://huachuan.en.alibaba.com/product/203468561-200747405/stain..., visited May 7, 2009 (3 pages).
International Search Report and Written Opinion for PCT Patent Application No. PCT/US2010/045887, filed Aug. 18, 2010.

*Primary Examiner* — Andre J Allen
(74) *Attorney, Agent, or Firm* — Kinney & Lange, P.A.

(57) ABSTRACT

An industrial process transmitter apparatus includes a housing chassis of a first metallic material and a housing skin of a second metallic material. The housing chassis includes a substantially cylindrical body portion, a first circumferentially extending support member located at or near a first end of the body portion of the housing chassis, and a second circumferentially extending support member located at or near a second end of the body portion of the housing chassis opposite the first end. The first circumferentially extending support member extends radially outward from the body portion, and the second circumferentially extending support member extends radially outward from the body portion. The housing skin is fitted over the housing chassis and is in physical contact with both the first and second circumferentially extending support members. The housing skin is spaced from the housing chassis in between the first and second circumferentially extending support members.

31 Claims, 14 Drawing Sheets

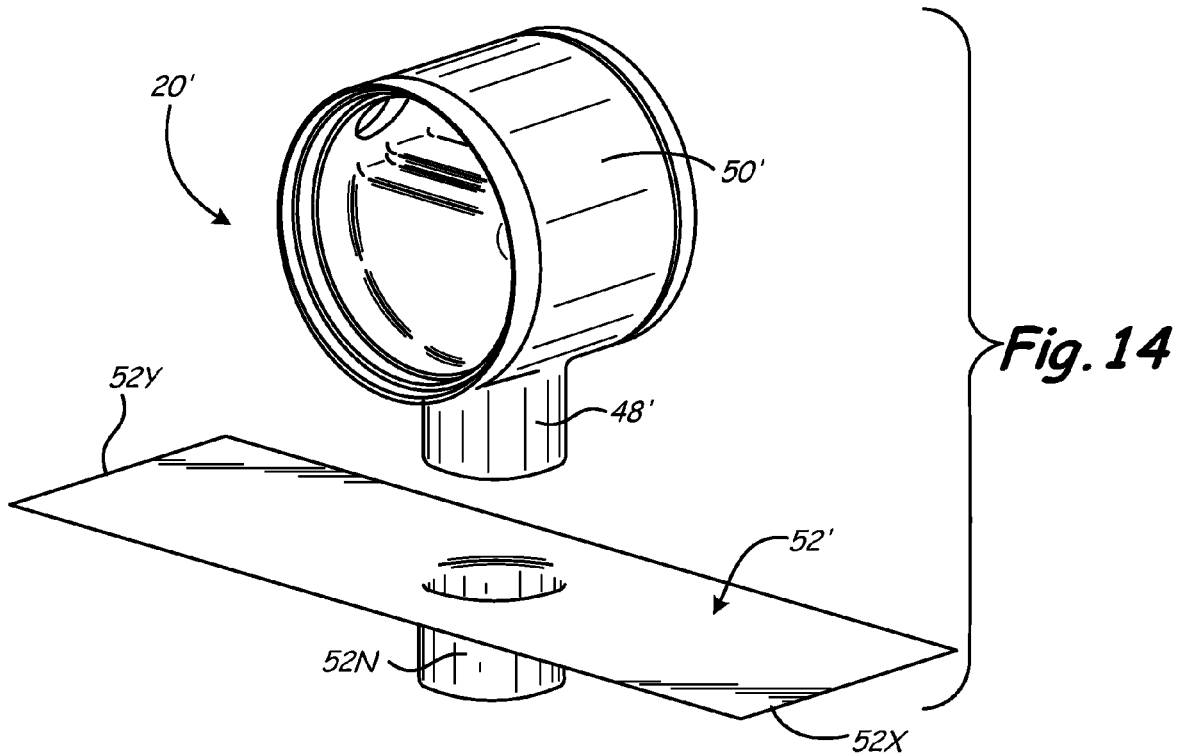
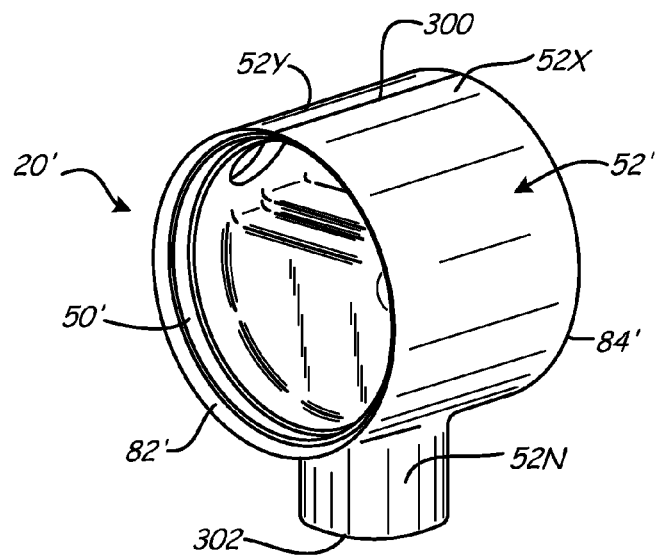

US 7,984,652 B2

CLAD INDUSTRIAL PROCESS TRANSMITTER HOUSING WITH CHASSIS

BACKGROUND

The present invention relates to industrial process transmitters, and more particularly to housing assemblies for industrial process transmitters and methods of making the same.

Industrial process transmitters are used to sense, measure, manage and control processes in industrial processing facilities. Typically, industrial process transmitters include a housing that is sealed and explosion-proof. The geometry of these housings, both internal and external, can be relatively complex. In the prior art, these housings were generally one-piece die-castings made from aluminum, which is a material well-suited for die casting. Additional machining was then performed on the die-casting, as desired, and the casting was painted. However, aluminum is a relatively reactive material, making it less desirable for certain applications were the housing is exposed to materials that are reactive, caustic, etc. Paints and similar coatings may be undesired or inadequate for protecting the aluminum material of the housing in certain applications. Other materials, like stainless steel, are not readily able to be die cast, but instead require a process like investment casting, which is a relatively complicated and expensive process as compared to die casting. Furthermore, casting processes tend to leave relatively rough surfaces (greater than about 125 Ra), which are undesirable for hygienic applications where rigorous cleaning or sterilization processes must be performed. Machining all surfaces of a casting to increase smoothness would be an undesirably time-consuming and expensive undertaking.

Thus, an alternative industrial process transmitter housing assembly is desired.

SUMMARY

An industrial process transmitter apparatus according to the present invention includes a housing chassis of a first metallic material and a housing skin of a second metallic material. The housing chassis includes a substantially cylindrical body portion, a first circumferentially extending support member located at or near a first end of the body portion of the housing chassis, and a second circumferentially extending support member located at or near a second end of the body portion of the housing chassis that is opposite the first end. The first circumferentially extending support member extends radially outward from the substantially cylindrical body portion, and the second circumferentially extending support member extends radially outward from the substantially cylindrical body portion. The housing skin is fitted over the housing chassis and is in physical contact with both the first and second circumferentially extending support members of the housing chassis. The housing skin is spaced from the housing chassis in between the first and second circumferentially extending support members.

BRIEF DESCRIPTION OF THE DRAWINGS

FIG. 14 is an exploded perspective view of an alternative embodiment of an industrial process transmitter according to the present invention.

FIG. 15 is a perspective view of the embodiment of an industrial process transmitter of FIG. 14.

DETAILED DESCRIPTION

Figure 1:
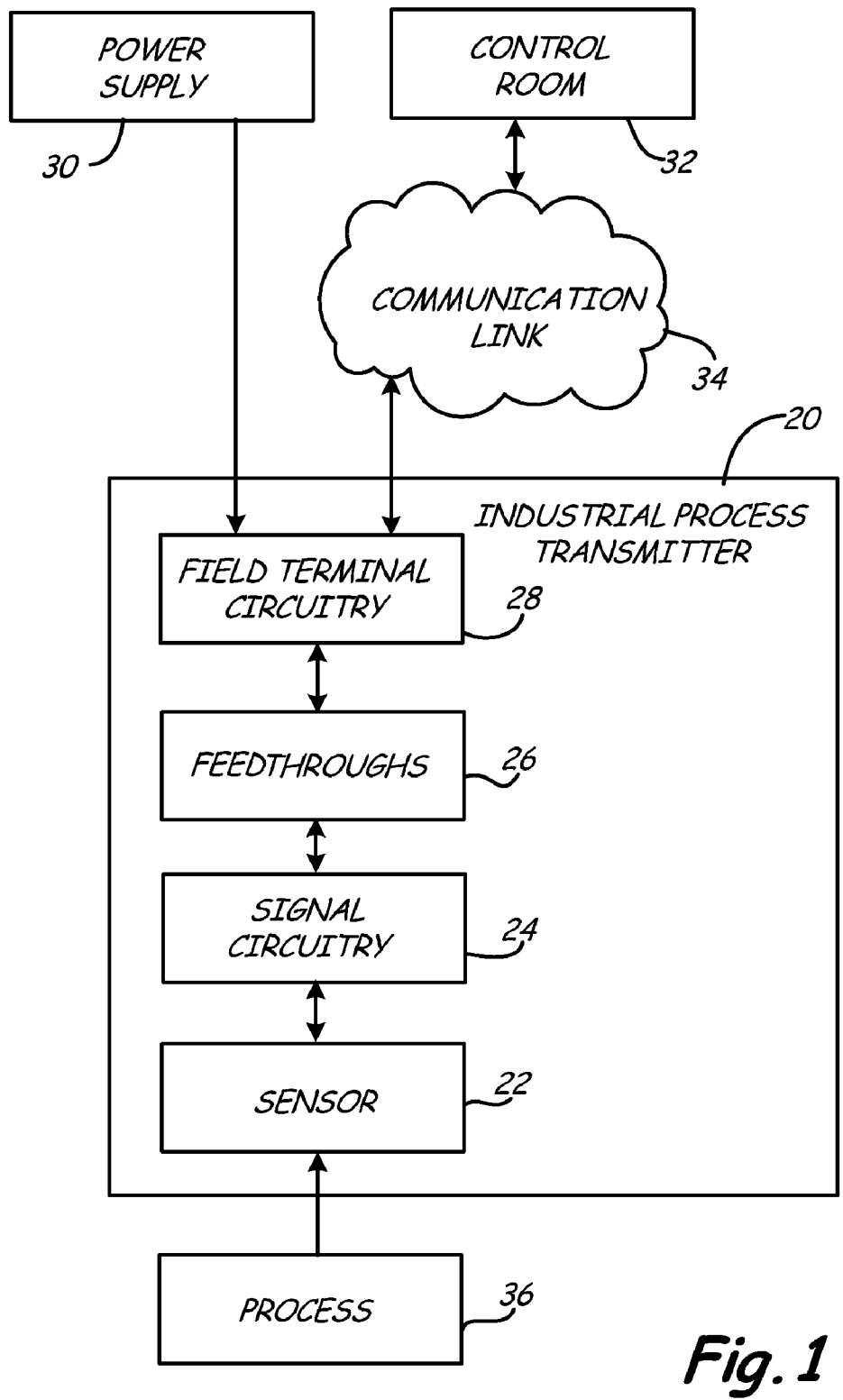
FIG. 1 is a schematic block diagram of an industrial process transmitter assembly.

In general, the present invention provides to an industrial process transmitter assembly (also called a field device assembly) having a stainless steel outer skin and an aluminum chassis (or core), and a method of making the same. FIG. 1 is a schematic block diagram of one embodiment of an industrial process transmitter 20 that includes a sensor 22, signal circuitry 24, one or more feedthroughs 26, and field terminal circuitry 28. The industrial process transmitter assembly 20 is operably connected to a power supply 30 and to a control room 32 through a communication link 34. Furthermore, the industrial process transmitter 20 is installed at a location to sense, measure, manage and/or control an industrial process 36.

In one embodiment, the sensor 22 is a pressure sensor of a known configuration positioned in operative contact with the industrial process 36. In alternative embodiments, the sensor 22 can be configured to sense or measure temperature, vibration, flow, or nearly any other parameter associated with the industrial process 36. The sensor 22 can be positioned relative to the industrial process 36 in any manner suitable for the type of parameter desired to be sensed or measured. In further alternative embodiments, the sensor 22 could be replaced with an actuator or other device that manages, controls, or otherwise interacts with the industrial process 36.

The signal circuitry 24 is operatively connected to the sensor 22. Data signals from the sensor 22 are sent to the signal circuitry 24, which can perform desired operations on or with those data signals. For instance, the signal circuitry 24 can store, filter, compress, convert, summarize, analyze, or otherwise process raw data from the sensor 22 as desired for particular applications. The signal circuitry is typically sealed off from the industrial process 36 and the environment inside the industrial process transmitter 20 in order to help prevent damage or malfunction.

The field terminal circuitry 28 is located within the industrial process transmitter assembly, and is typically sealed off from the industrial process 36 and also from the signal circuitry. The one or more feedthroughs 26 (see FIG. 9) electrically connect the field terminal circuitry 28 to the signal circuitry 24. In one embodiment, the feedthroughs 26 provide electromagnetic interference (EMI) filtering in a conventional manner. The field terminal circuitry 28 can store, filter, compress, convert, summarize, analyze, or otherwise process data or other signals from the signal circuitry 24. The field terminal circuitry 28 is operatively connected to the control room 32 via the communication link 34, enabling communication between the field terminal circuitry 28 and control room 32. In this way, data or other signals can be sent from the field terminal circuitry 28 to the control room 32, and commands or other signals can be sent from the control room 32 to the field terminal circuitry 28. The communications link 34 can be a direct wired connection, an Internet connection, a local area network (LAN), wide area network (WAN), virtual private network (VPN), a wireless connection (e.g., a mesh network), or any other suitable communication. Furthermore, the field terminal circuitry 28 can receive power input from the power supply 30, which can be a line voltage, an energy harvesting device, and energy storage device, or other type of power source. Power received by the field terminal circuitry 28 can be distributed for use by other components the industrial process transmitter assembly 20.

It should be noted that the industrial process transmitter 20 can include additional components not specifically mentioned. For example, circuitry to provide additional functionality can be provided as desired for particular applications.

Figure 2:
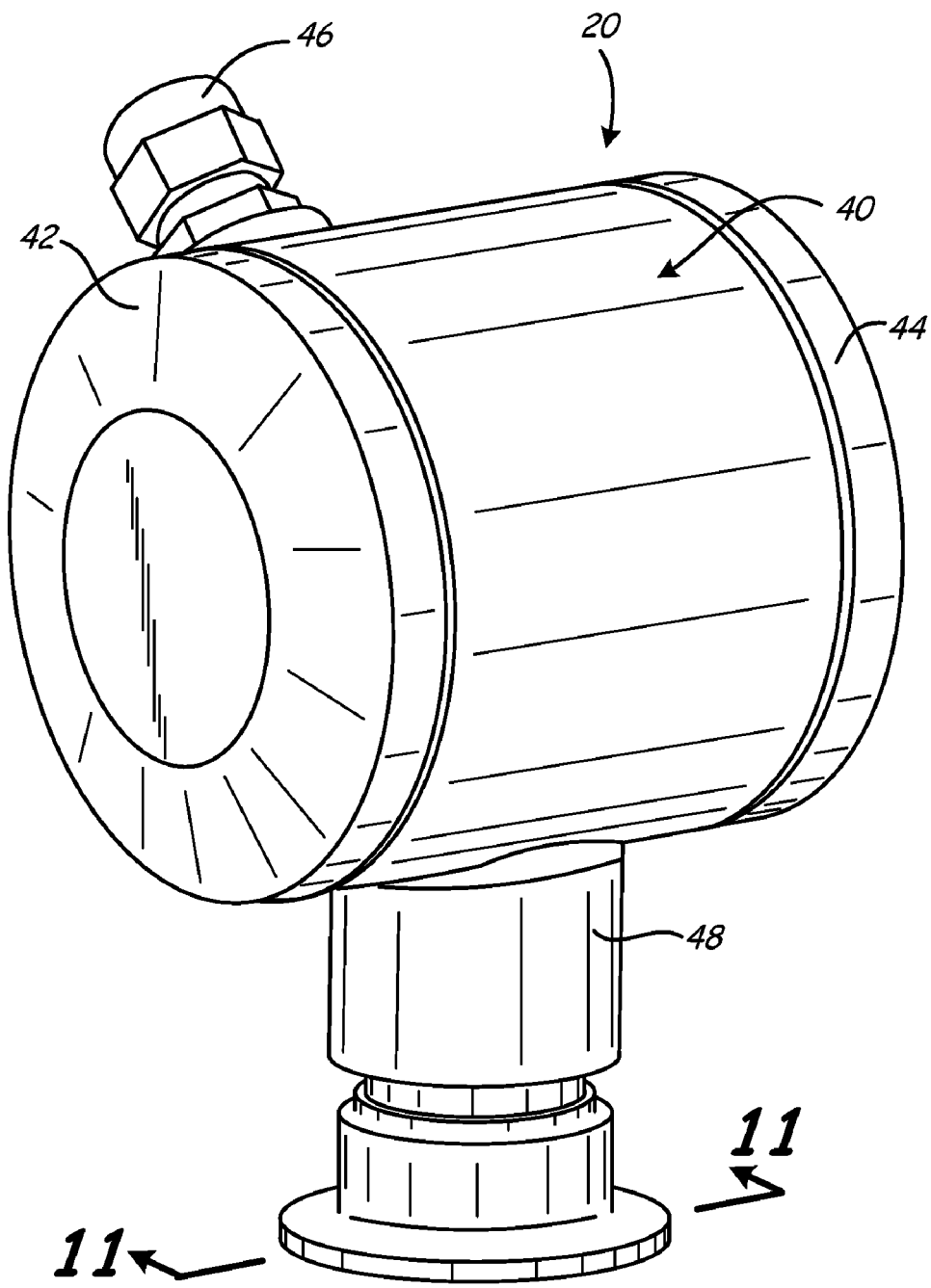
FIG. 2 is a perspective view of an industrial process transmitter according to the present invention.

FIG. 2 is a perspective view of an industrial process transmitter 20 that includes a housing body 40, first and second covers 42 and 44 engaged at opposite ends of the housing body 40, a conduit 46 extending from the housing body 40 and a neck 48 extending from the housing body 40. In the illustrated embodiment, the housing body 40 has a substantially cylindrical shape. The conduit 46 and the neck 48 protrude from the housing body 40 in different directions. The neck 48 can at least partially contain a sensor 22, and can be mounted to a desired location for operatively interacting with an industrial process. The neck 48 can be secured to the mounting location and provide structural support for the rest of the industrial process transmitter 20. The conduit 46 can at least partially house field wiring that can electrically connect circuitry within the housing body 40 to external equipment. In a typical installation, the conduit 46 is connected to another suitable electrical conduit (not shown). The particular configuration of the conduit 46 and the neck 48 can vary as desired for particular applications, such as for the neck 48 to accommodate a particular type of sensor 22 and for the conduit 46 to connect to provide a type of external electrical connection.

Figure 3:
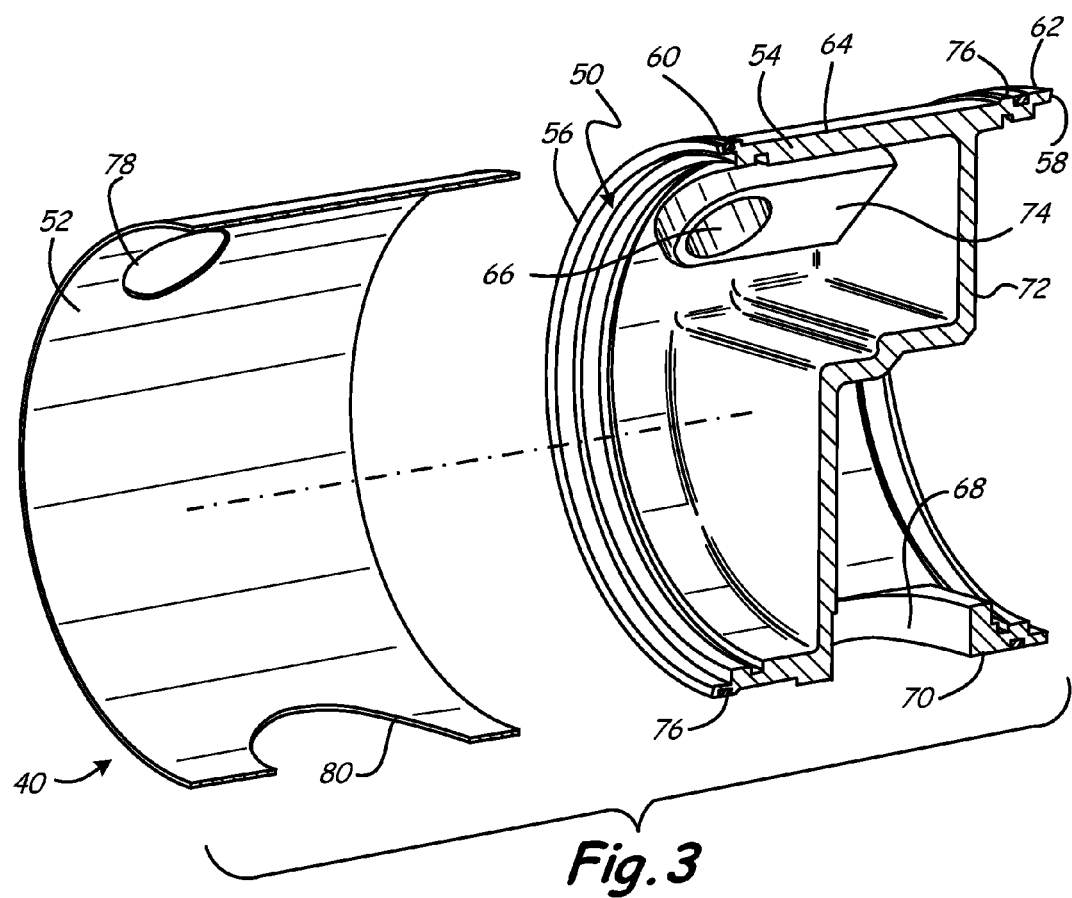
FIG. 3 is an exploded, cross-sectional perspective view of a portion of one embodiment of an industrial process transmitter.
Figure 4:
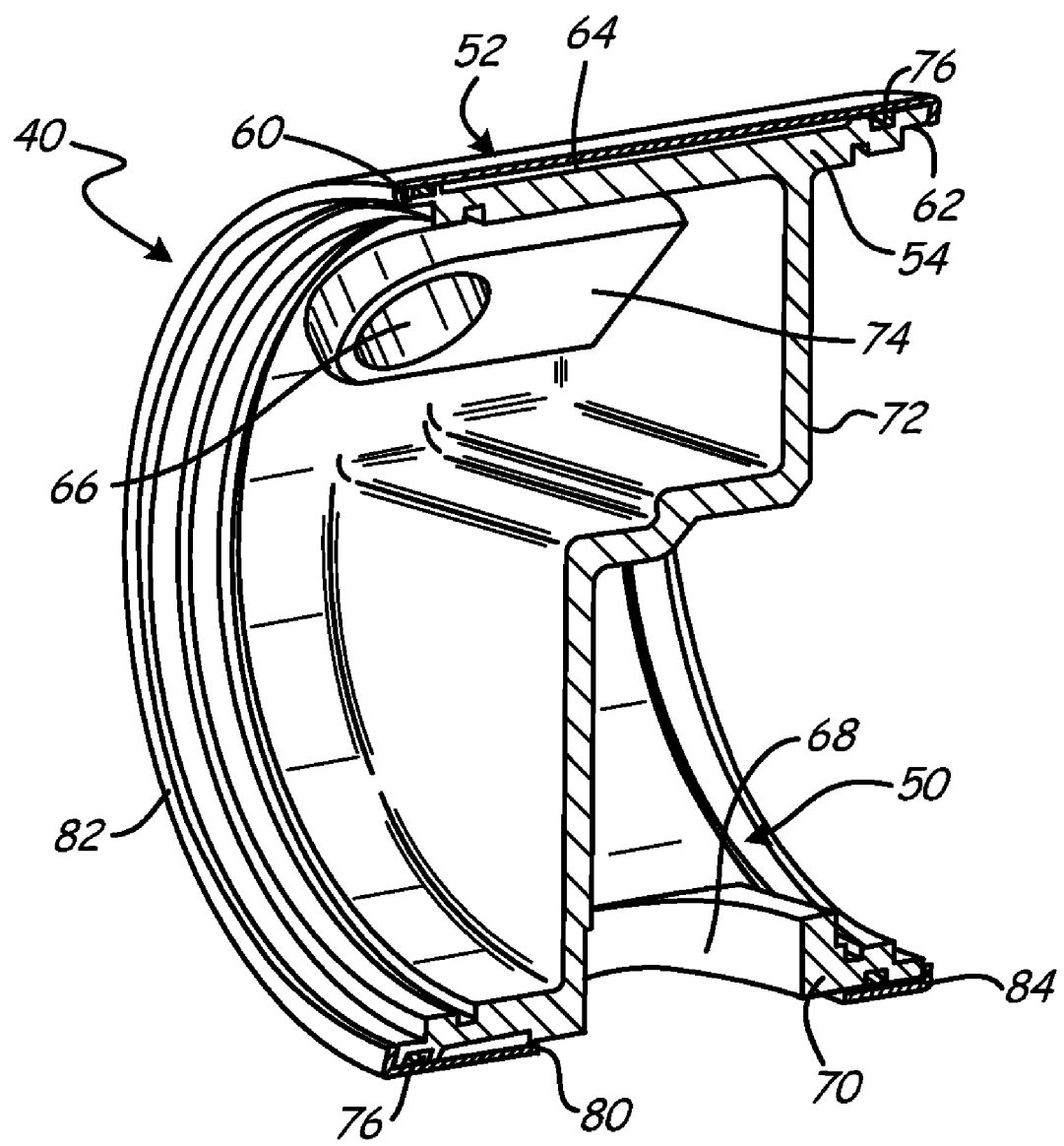
FIG. 4 is a cross-sectional perspective view of the portion of the industrial process transmitter of FIG. 3.

FIG. 3 is an exploded, cross-sectional perspective view of one embodiment of the housing body 40 that includes a chassis (or housing chassis) 50 and a skin (or housing skin) 52, shown during assembly. FIG. 4 is a cross-sectional perspective view of the housing body 40 of FIG. 3, shown with the chassis 50 and the skin 52 assembled together. As shown in FIGS. 3 and 4, the chassis 50 includes a substantially cylindrical body 54 having a first end 56 and an opposite second end 58. A first support member (or land) 60 is located at or near the first end 56, and a second support member (or land) 62 is located at or near the second end 58. The first and second support members 60 and 62 each extend circumferentially and protrude radially outward from the body 54, and can each be integrally formed with the body 54. A circumferentially-extending recess (or groove) 64 is defined in between the first and second support members 60 and 62 at an outer surface of the body 54. First and second openings 66 and 68 are formed through the body 54 at the recess 64. In the illustrated embodiment the first and second openings 66 and 68 have circularly shaped perimeters. An additional support member (or land) 70 is defined about the first and the second openings 66 and 68 (only the support member 70 about the second opening 68 is visible in FIGS. 3 and 4). Each additional support member 70 extends about a perimeter of the respective first or second opening 66 or 68, and extends radially outward from the body 54. An internal wall 72 extends across the body 54 to divide the chassis 50 into two compartments. In the illustrated embodiment, the wall 72 defines a shelf and is positioned between the first opening 66 and the second opening 68, such that the first and second openings 66 and 68 open into different compartments within the chassis 50. Furthermore, a thickened structure 74 is located along an interior surface of the body 54 so as to surround the first opening 66.

The chassis 50 can be made out of aluminum, or another suitable material. As will be discussed in turn, the chassis 50 can be die cast and then machined to produce a desired configuration. Suitable machining processes can be used to define or shape the first and second openings 66 and 68, outer surfaces of the support members 60, 62 and 70, and other features as desired.

In the illustrated embodiment, seal members 76 (e.g., O-rings) are provided recessed within outer surfaces of the first support member 60 and the second support member 62 of the chassis 50. The seal members 76 are optional, and can be omitted from alternative embodiments. The function of the seal members 76 is discussed below.

It should be noted that the configuration of the chassis 50 can vary as desired for particular applications. For instance, the wall 72 can be omitted, or additional walls can be added in order to provide a desired number of internal compartments in the chassis 50. Moreover, the number and location of the openings 66 and 68 can vary as desired for particular applications. In addition, further support members extending from the body 54 can be provided in further embodiments.

The skin 52 is configured as a generally cylindrical sleeve. As shown in FIG. 3, first and second openings 78 and 80 are formed in the skin 52 at locations substantially aligned relative to the first and second openings 66 and 68 in the chassis 50. Perimeter edges of the first and second openings 78 and 80 rest on the additional support members 70. In the illustrated embodiment, the first and second openings 78 and 80 have circularly shaped perimeters and have diameters larger than the respective first and second openings 66 and 68 in the chassis 50. As shown in FIG. 4, first and second lips 82 and 84 are formed by opposite edges of the skin 52, with the first lip 82 located at the first end 56 of the chassis 50 adjacent to the first support member 60 and the second lip 84 located at the second end 58 of the chassis 50 adjacent to the second support member 62.

The skin 52 can be made of stainless steel, or another suitable material. In one embodiment, an exterior surface of the skin 52 has an arithmetic average surface roughness of approximately 32 Ra or smoother. A relatively smooth exterior surface formed of stainless steel is well suited for use in hygienic applications, such as for food and beverage industries, as well as in corrosive environments, such as on offshore platforms.

When the chassis 50 and the skin 52 are assembled together, as shown in FIG. 4, the skin 52 rests upon at least portions of the first and second support members 60 and 62 and the additional support members 70 such that the skin 52 generally surrounds and covers the chassis 50. In this way the skin 52 is in direct physical contact with at least portions of the first and second support members 60 and 62 of the chassis 50. A void or cavity is formed between the recess 64 of the chassis 50 and the skin 52, such that the skin 52 is spaced from the body 54 of the chassis 50 adjacent to the recess 64. The first and second lips 82 and 84 help secure the skin 52 to the chassis 50, in particular limiting or preventing endwise sliding between the skin 52 and the chassis 50. The seal members 76 create fluidic seals between the chassis 50 and the skin 52, to reduce a risk of fluid entering the void at the recess 64. The presence of a fluid in the void between the skin 52 and the chassis 50 could undesirably promote corrosion, such as through a galvanic effect.

Figure 5:
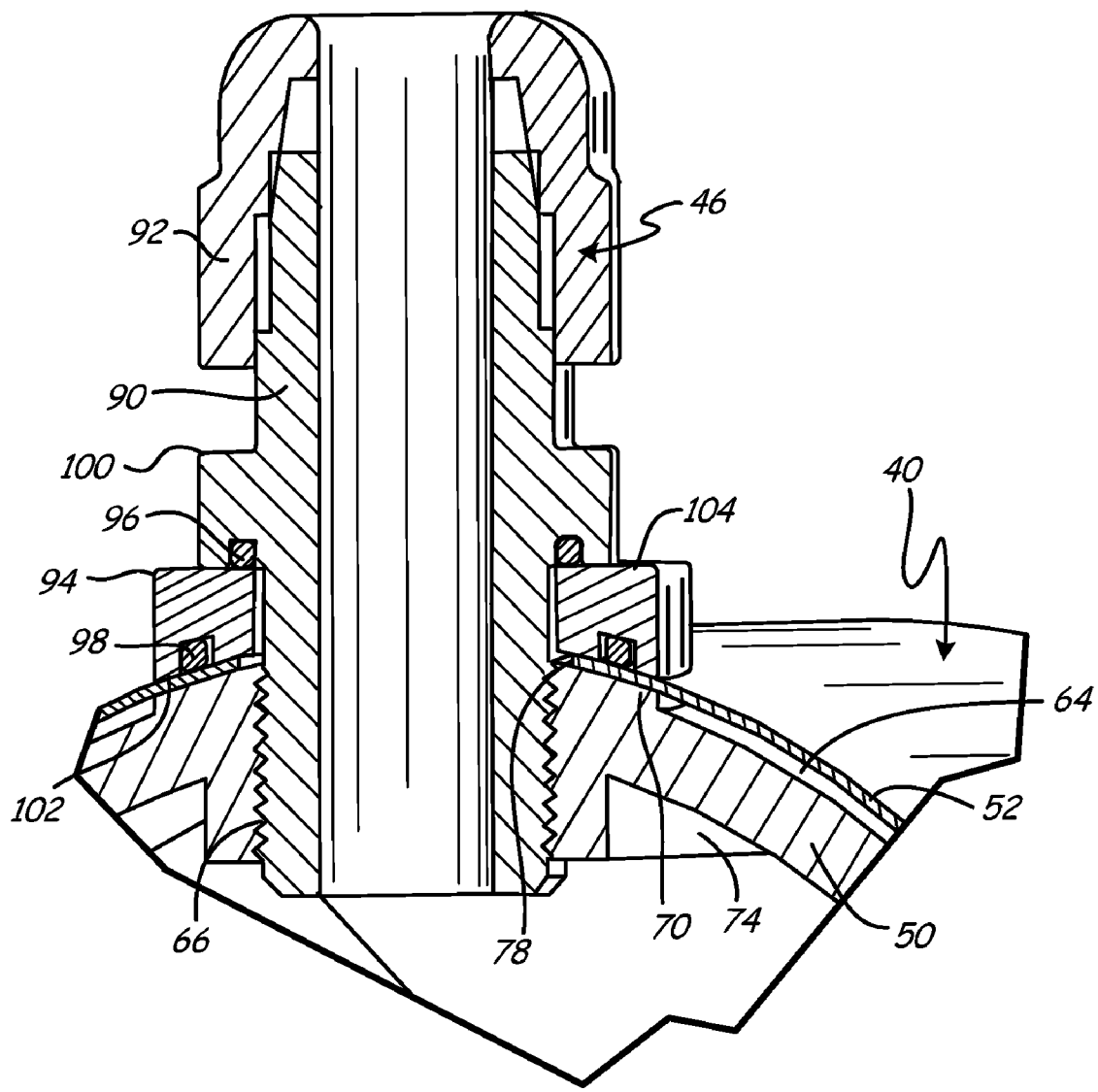
FIG. 5 is a cross-sectional view of another portion of the industrial process transmitter, showing a conduit.

FIG. 5 is a cross-sectional view of a portion of the industrial process transmitter 20, showing a conduit 46 and a portion of the housing body 40. The conduit 46 includes a body portion 90, a cap portion 92, an adapter ring 94, and seal members 96 and 98 (e.g., O-rings). In the illustrated embodiment, the body portion 90 is generally cylindrical in shape and has a circumferentially-extending flange 100. A central cavity of the body portion 90 allows wire or other components to pass through the conduit 46 into the housing body 40. The cap portion 92 is secured at one end of the body portion 90. Another end of the body portion 90, opposite the cap portion 92, is engaged to the chassis 50 of the housing body 40 at the opening 66. In the illustrated embodiment, a threaded engagement is provided between the body portion 90 of the conduit 46 and the chassis 50 of the housing body 40. The adapter ring 94 surrounds part of the body portion 90 and is positioned adjacent to the flange 100, between the flange 100 and the skin 52 of the housing body 40. The adapter ring 94 has a saddle shaped inner face 102 positioned against the skin 52. Because the skin 52 is generally cylindrically shaped, the saddle shape of the inner face 102 allows the adapter ring 94 to closely mate with adjacent portions of the skin 52. The seal member 98 creates a fluidic seal between the adapter ring 94 and the skin 52. The seal member 98 is positioned in a recess in the adapter ring 94 in the illustrated embodiment. An outer face 104 of the adapter ring 94 is located opposite the inner face 102 and is generally planar. The flange 100 of the body portion 90 is positioned adjacent to the outer face 104, and the seal member 96 creates a fluidic seal therebetween. The seal member 96 is positioned in a recess in the flange 100 in the illustrated embodiment. The seal members 96 and 98 help reduce a risk of fluid entering the housing body 40 through the openings 66 and 78.

Figure 6:
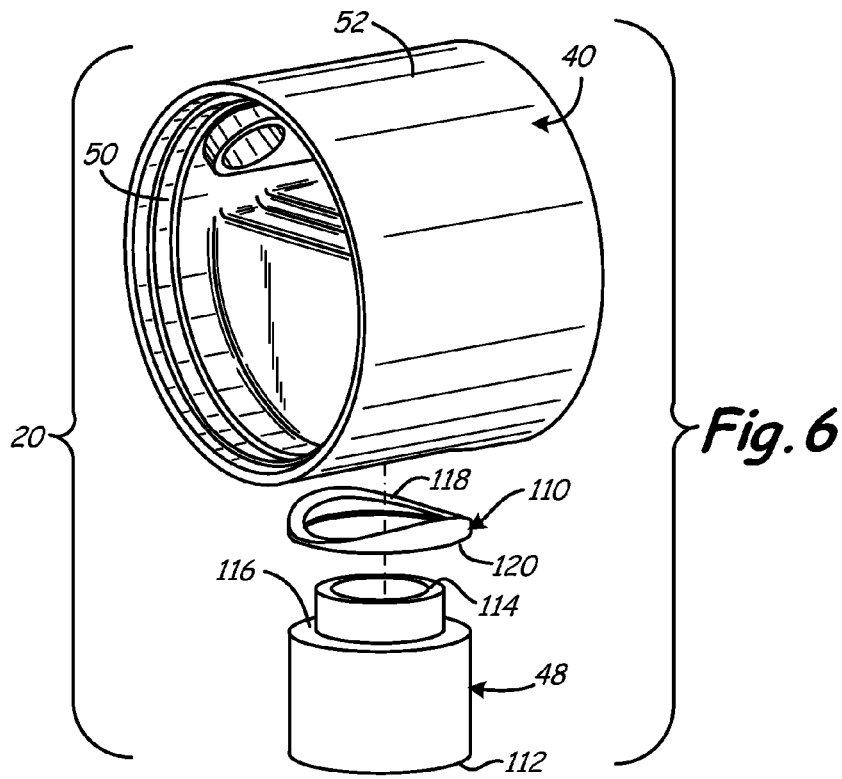
FIG. 6 is an exploded perspective view of another portion of the industrial process transmitter, showing a neck.
Figure 7:
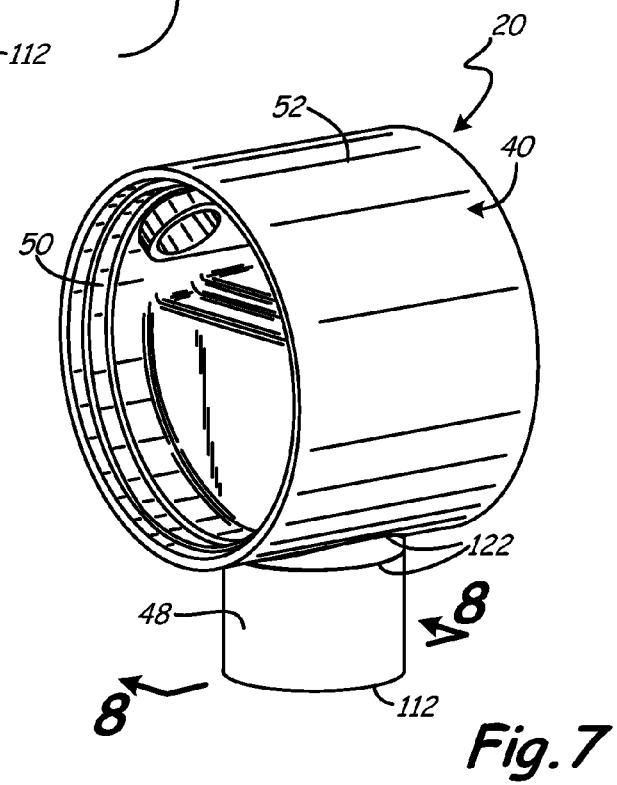
FIG. 7 is a perspective view of the portion of the industrial process transmitter of FIG. 6.
Figure 8:
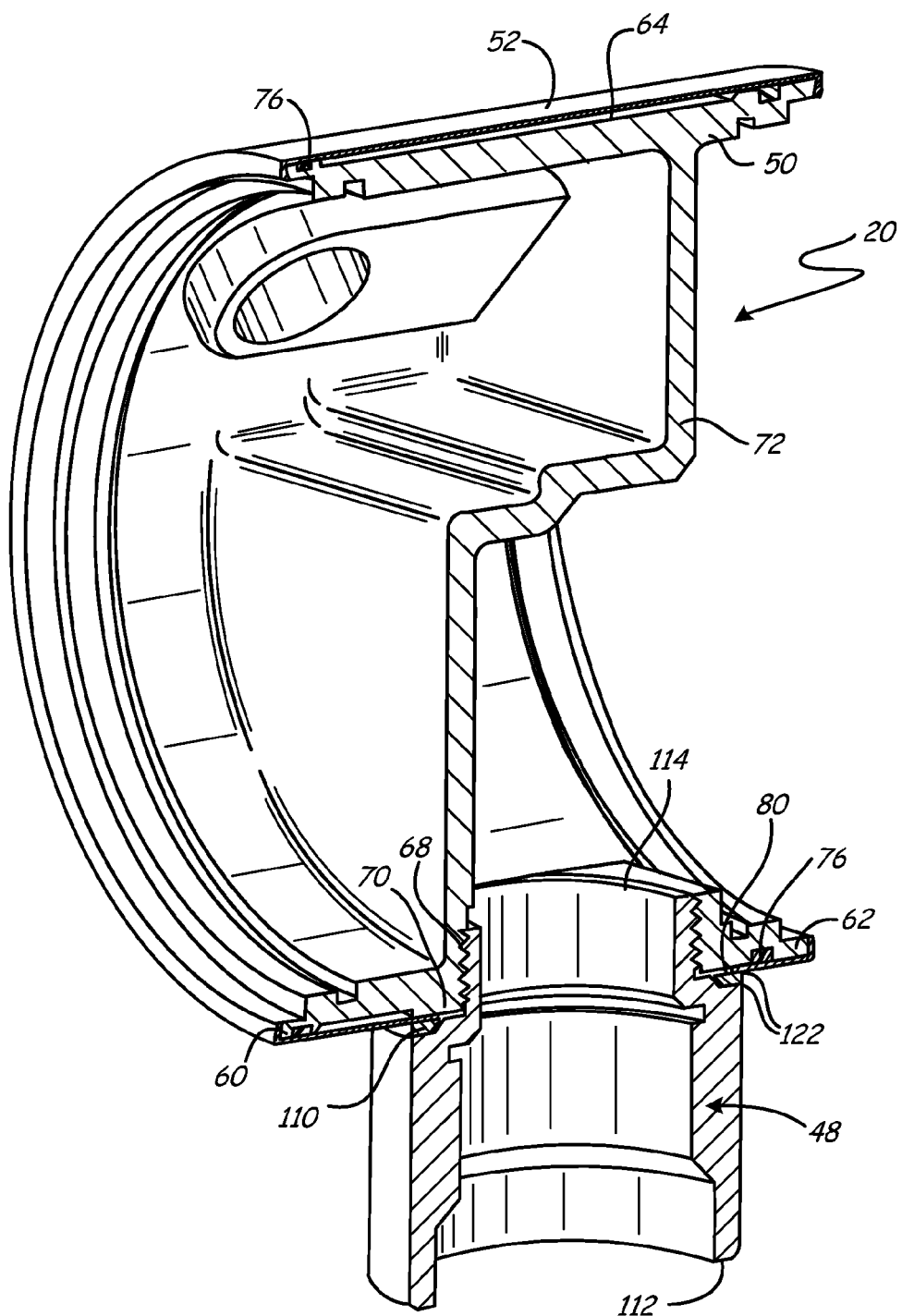
FIG. 8 is a cross-sectional perspective view of the industrial process transmitter, taken along line 8-8 of FIG. 7.

FIG. 6 is an exploded perspective view of another portion of the industrial process transmitter 20, showing the housing body 40, a neck 48, and an adapter ring 110. FIG. 7 is a perspective view of the portion of the industrial process transmitter 20 of FIG. 6, shown assembled together. FIG. 8 is a cross-sectional perspective view of the industrial process transmitter 20, taken along line 8-8 of FIG. 7. In the illustrated embodiment, the neck 48 has a generally cylindrical shape, with a distal end 112 and a proximal end 114. The proximal end 114 of the neck 48 is threaded. A shoulder 116 is formed adjacent to the threads at the proximal end 114. The neck 48 can be configured to contain portions of the sensor 22. The particular configuration of the neck 48 can vary as desired for particular applications, such as to accommodate a particular type of sensor or other component. The neck 48 can be made of stainless steel.

In this embodiment, the adapter ring 110 defines a saddle shaped inner face 118 and an opposite outer face 120 configured to mate with the shoulder 116 of the neck 48. The outer face 120 can have a substantially planar configuration. Because the skin 52 of the housing body 40 is generally cylindrically shaped, the saddle shape of the inner face 118 allows the adapter ring 110 to closely mate with adjacent portions of the skin 52. The adapter ring 110 further defines a central opening through which the proximal end 114 of the neck 48 can pass. In the illustrated embodiment, an outer diameter of the adapter ring 110 is equal to an outer diameter of the neck 48 adjacent to the shoulder 116. The adapter ring 110 can be made of stainless steel.

When assembled, the proximal end 114 of the neck 48 is threadably engaged to the chassis 50 of the housing body 40 at the opening 68. A portion of the neck 48 passes through the adapter ring 110. The adapter ring 110 is positioned in between the skin 52 of the housing body 40 and the shoulder 116 of the neck 48, with the inner face 118 in contact with the skin 52 and the outer face 120 in contact with the neck 48 at the shoulder 116. Weld joints 122 are formed between the skin 52 and the adapter ring 110, and between the adapter ring and the neck 48 at the shoulder 116. The weld joints 122 can form hermetic seals to reduce a risk of fluid entering the housing body 40 through the openings 68 and 80. Furthermore, the saddle shape of the inner face 118 of the adapter ring 110 allows close mating with the cylindrical shape of the skin 52, while presenting the substantially planar outer face 120 to allow rotation of the neck 48 to threadably engage the proximal end 114 with the chassis 50 without obstruction.

Figure 9:
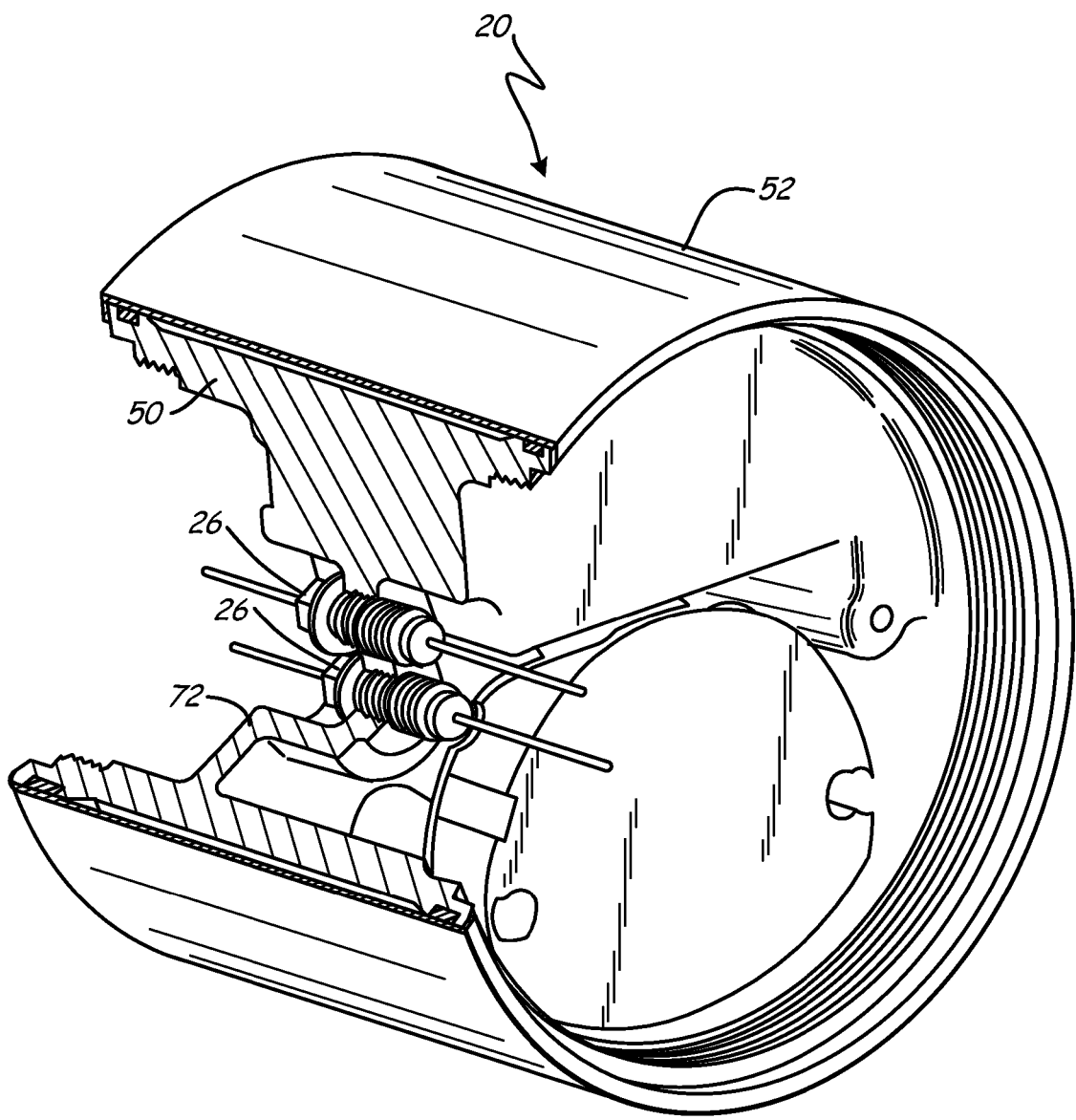
FIG. 9 is a quarter-section perspective view of the industrial process transmitter and selected internal electrical components.

FIG. 9 is a quarter-section perspective view of the industrial process transmitter 20. As shown in the illustrated embodiment, electrical feedthroughs 26 are threadably engaged through the wall 72 to provide electrical connections between separate compartments defined by the chassis 50. Any number of electrical feedthroughs 26 can be provided as desired for particular applications. The feedthroughs can be configured such that a sealed and explosion proof barrier exists between the compartments spanned by the feedthroughs 26, while still providing electrical connections between compartments through the wall 72. This allows circuitry in one compartment (e.g., the signal circuitry 24) to be electrically connected to circuitry (e.g., the field terminal circuitry 28) in another compartment.

Figure 10:
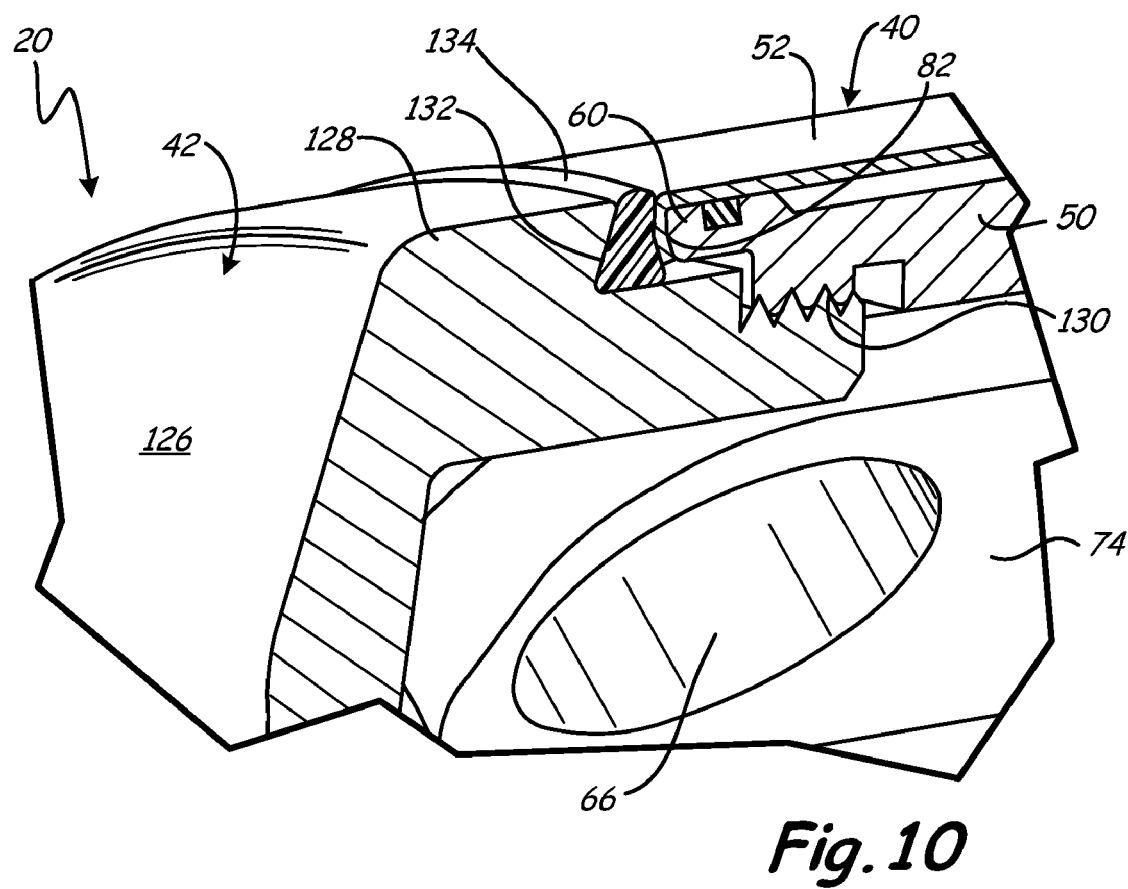
FIG. 10 is a cross-sectional perspective view of a portion of the industrial process transmitter with one embodiment of a cover.

FIG. 10 is a cross-sectional perspective view of a portion of the industrial process transmitter 20, shown with the housing body 40 engaged with one embodiment of a cover 42. In the illustrated embodiment, the cover 42 is formed as a single, solid body. The cover includes a generally disc-shaped central portion 126 and a flange 128. The cover 42 can be made of stainless steel. In the illustrated embodiment, the flange 128 is annularly shaped and extends from a circumference of the central portion 126. Radially outwardly facing threads 130 are formed on the flange 128 for engagement with the chassis 50. A shoulder 132 is formed on the flange 128 adjacent to the threads 130. A seal member 134 (e.g., an O-ring) is positioned at the shoulder 132 of the cover 42, such that when the cover 42 is fully secured to the housing body 40 the seal member 132 abuts both the shoulder 132 of the cover 42 and the lip 82 of the skin 52 of the housing body 40. A fluidic seal is thereby created between the cover 42 and the housing body 40, to reduce a risk of fluid entering the housing body 40. It should be noted that the cover 44 shown in FIG. 2 can be configured substantially identically to the cover 42.

Figure 11:
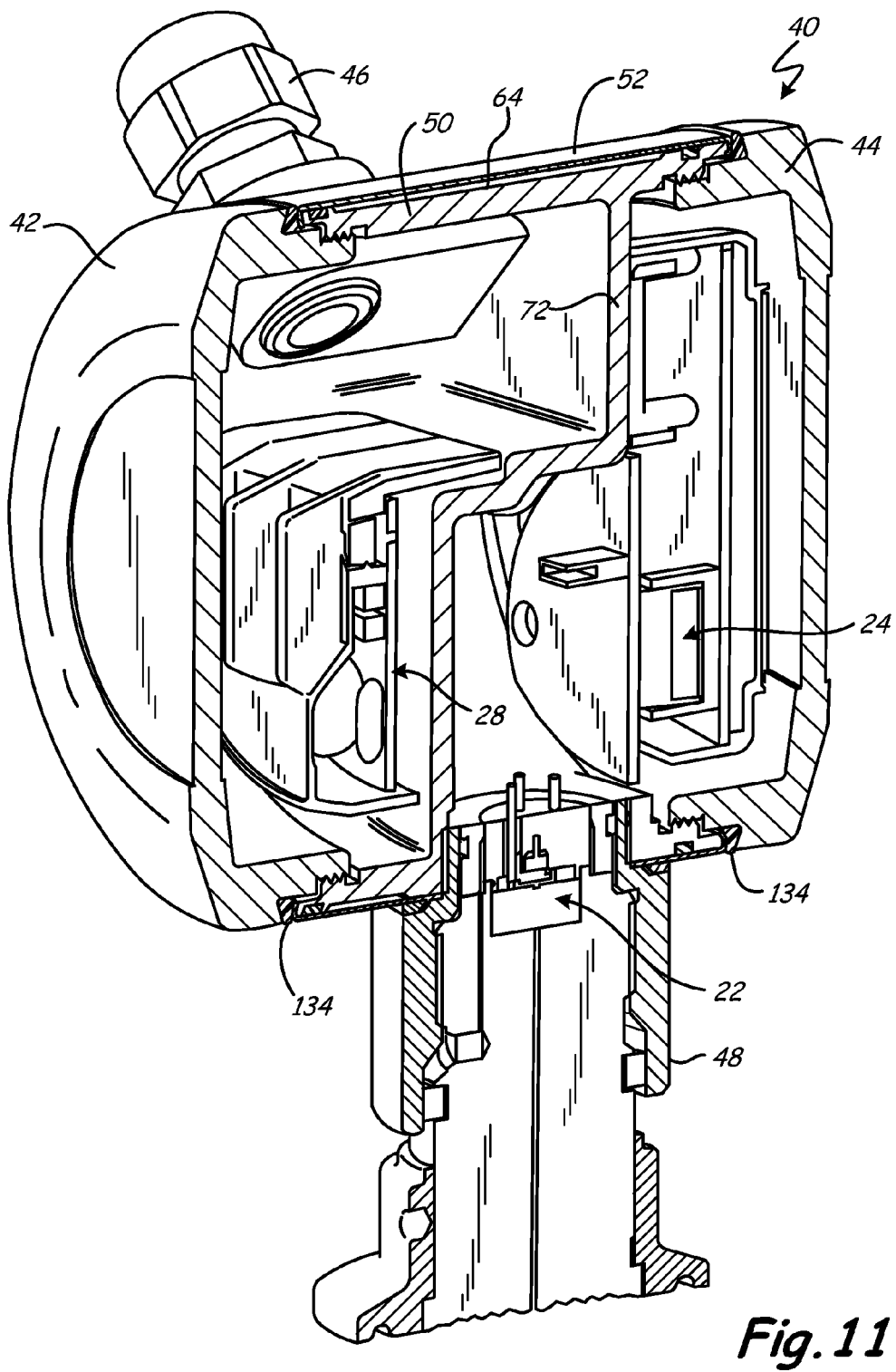
FIG. 11 is a cross-sectional view of the industrial process transmitter, taken along line 11-11 of FIG. 2.

FIG. 11 is a cross-sectional view of the industrial process transmitter 20, taken along line 11-11 of FIG. 2. As shown in FIG. 11, the industrial process transmitter 20 is fully assembled, with two of the covers 42 and 44 engaged at opposite ends of the housing body 40, with the sensor 22 installed at the neck 48, and with the signal circuitry 24 and the field terminal circuitry 28 positioned in separate compartments within the housing body 40. The neck 48 opens to one compartment of the housing body 40, while the conduit 46 opens to a separate compartment. During operation, fluid sometimes enters the housing body 40 through the conduit 46 due to the presence of fluid in a conduit connected to the conduit 46. However, the wall 72 helps to isolate the signal circuitry 24 and the sensor 22 from fluid introduced to the housing body 40 through the conduit 46.

Figure 12:
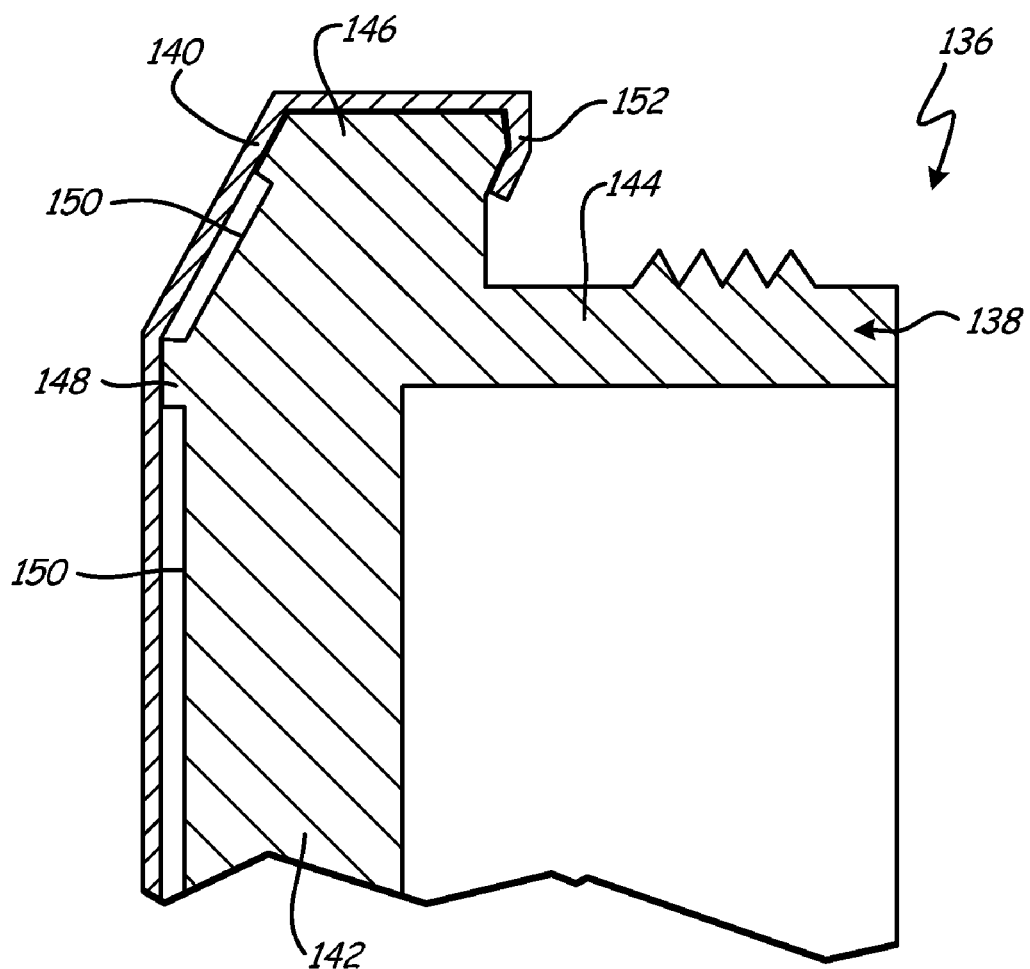
FIG. 12 is a cross-sectional view of a portion of an alternative embodiment a cover.

FIG. 12 is a cross-sectional view of a portion of an alternative embodiment a cover 136. The cover 136 is configured to engage the housing body 40 in a similar manner to the covers 42 and 44. However, as opposed to being a single solid body, the cover 136 includes a cover chassis 138 and a cover skin 140. The cover chassis 138 includes a generally disc shaped central portion 142 and an annular flange 144. A first support member (or land) 146 is formed at or near an outer diameter of the central portion 142, and one or more additional support members (or lands) 148 are formed at radially inner locations on the central portion 142. The support members 146 and 148 are generally positioned adjacent to corners of the cover chassis 138, and any other location where support for the cover skin 140 is desired. Recesses (or grooves) 150 are defined adjacent to the support members 146 and 148. The cover chassis 138 can be made of aluminum, or another suitable material.

The cover skin 140 has a lip 152 formed at a perimeter thereof. The cover skin 140 can be made of stainless steel, or another suitable material. In one embodiment, an exterior surface of the cover skin 140 has an arithmetic average surface roughness of approximately 32 Ra or smoother. A relatively smooth exterior surface formed of stainless steel is well suited for use in hygienic applications and corrosive environments.

When the cover chassis 138 and the cover skin 140 are assembled together, the cover skin 140 rests upon at least portions of the support members 146 and 148 such that the cover skin 140 generally covers and surrounds the cover chassis 138. In this way the cover skin 140 is in direct physical contact with at least portions of the support members 146 and 148 of the cover chassis 138. A void or cavity is formed between the recesses 150 of the cover chassis 138 and the cover skin 140, such that the cover skin 140 is spaced from the central portion 142 of the cover chassis 138 adjacent to the recesses 150. The lip 152 helps secure the cover skin 140 to the cover chassis 138.

Figure 13:
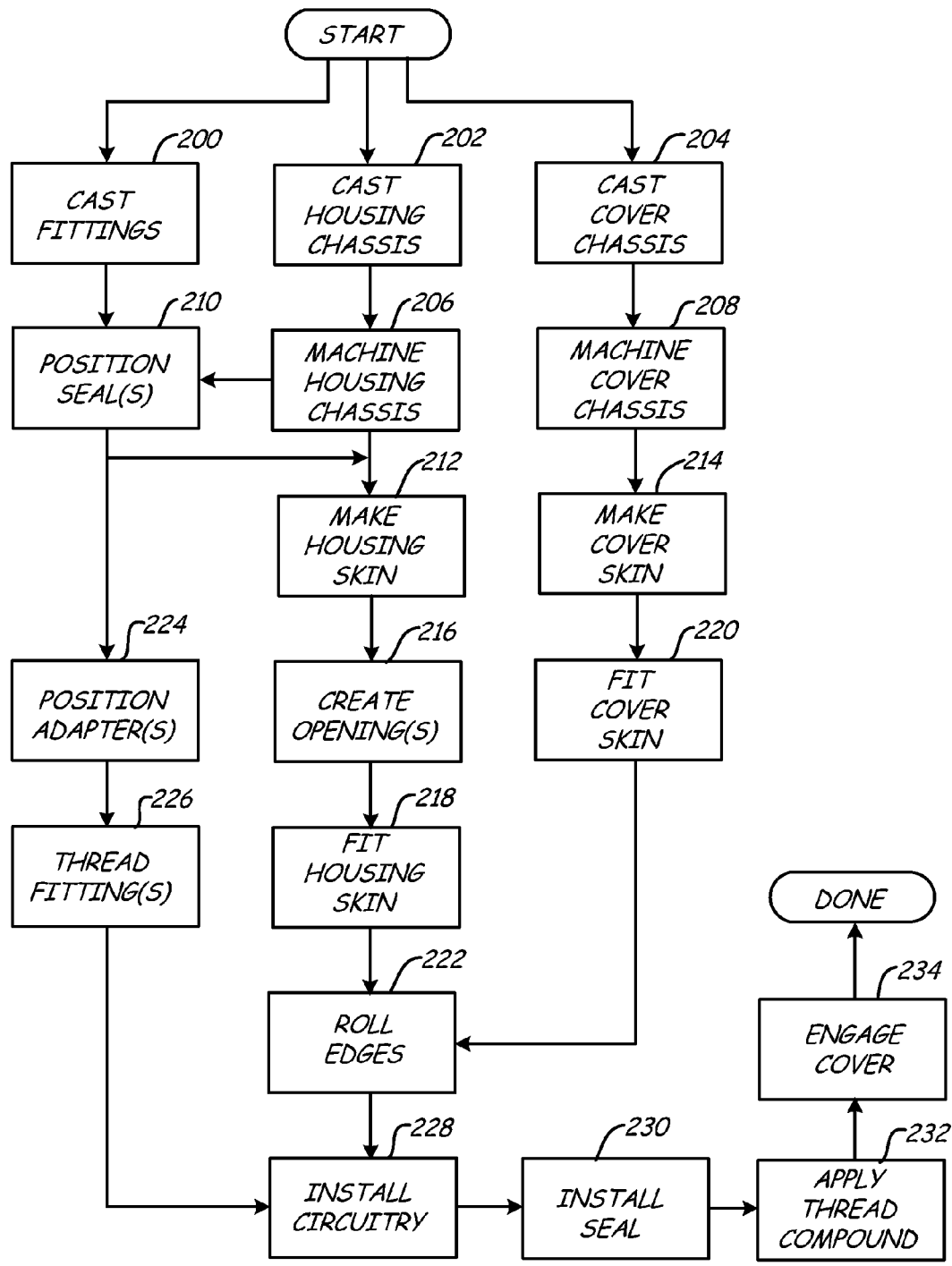
FIG. 13 is a flow chart of a method of making an industrial process transmitter according to the present invention.

FIG. 13 is a flow chart of one method of making the industrial process transmitter 20, in an embodiment using the housing body 40 and the cover 136. Fittings (e.g., the conduit 46 and the neck 48) are cast (step 200), the housing chassis 50 is cast (step 202), and the cover chassis 138 is cast (step 204). Steps 200, 202 and 204 can be performed simultaneously or at different times, as desired. The housing chassis 50 and the cover chassis 138 can each be die cast from aluminum, or alternatively using another known casting process. Die casting is suitable for use with a material like aluminum, and facilitates casting the relatively complex three-dimensional shape of a typical housing chassis 50, which will often include multiple internal compartments formed by the wall 72, features like the thickened structure 74, etc. The fittings can be cast using any suitable process. In some embodiments, fittings like the conduit 46 and the neck 48 are cast from stainless steel. It should be noted that in alternative embodiments, steps 200, 202 and 204 could involve injection molding or machining instead of casting.

After the housing chassis 50 and the cover chassis 138 are cast in steps 202 and 204, each is machined in steps 206 and 208, respectively. Machining in steps 206 and 208 includes machining support members (e.g., support members 60, 62, 70, 146, 148) on the housing chassis 50 and the cover chassis 138 to desired dimensions. The presence of support members helps to focus and ultimately limit the total amount of machining required to compensate for natural tolerance variations present from casting operations. Additional machining, such as to form threads, form receiving grooves for seals, remove excess material, etc., can be performed on the fittings, the housing chassis 50 and/or the cover chassis 138 as desired for particular applications. After machining, seals (e.g., seal members 76, 96 and 98) are positioned (step 210).

The housing skin 52 and the cover skin 140 are made in steps 212 and 214, respectively. The skins 52 and 140 can be made using a drawing process, or any other suitable process. Once the housing skin 52 has been made, one or more openings (e.g., the openings 66 and 68) are created in the skin 52, using a machining process or any other suitable process (step 216). Steps 212, 214 and 216 can each be performed, before, simultaneously with, or after any of the previously-described steps.

Next, the housing skin 52 is fit over the housing chassis 50 (step 218) and the cover skin 140 is fit over the cover chassis 138 (step 220). In one embodiment, conventional shrink-fitting techniques are utilized to fit the skins 52 and 140 to the chassis 50 and 138, respectively, such that the skins 52 and 140 rest on the support members 60, 62, 70, 146, 148 tightly and firmly. Fitting performed in steps 218 and 220 includes providing a desired alignment of the housing skin 52 relative to the housing chassis 50 and of the cover skin 140 relative to the cover chassis 138, such as to substantially align the opening 78 in the housing skin 52 with the opening 66 in the housing chassis 50 and to substantially align the opening 80 in the housing skin 52 with the opening 68 in the housing chassis 50. Once positioned as desired, edges of the skins 52 and 140 are rolled to form the lips 82, 84 and 152 (step 222), to help secure the skins 52 and 140 to the chassis 50 and 138, respectively.

In the illustrated embodiment, adapters (e.g., adapters 104 and 110) are positioned relative to openings in the housing body 40 (e.g., the openings 78 and 80) (step 224), and the fittings are threaded into engagement with the housing body 40 through the adapters (step 226).

After structural components of the industrial process transmitter 20 are assembled, electrical components can be installed. Circuitry (e.g., the field terminal circuitry 28, the feedthroughs 26, the signal circuitry 24 and the sensor 22) is installed (step 228). Any other internal components utilized for particular application can also be installed. Then seals 134 are installed (step 230), and a thread compound of a known type (e.g., thread sealing tape, thread locking compound, or thread lubricant) is applied to the threads on the cover 136 and/or the housing body 40 (step 232). The cover 136 is then engaged with the housing body 40 by threadably securing the cover chassis 138 to the housing chassis 50 such that the seals 134 provide a fluidic seal at the interface of the cover 136 and the housing body 40 (step 234).

It should be noted that in alternative embodiments the method described above can include additional steps not specifically mentioned. Moreover, particular steps can be omitted, for instance, by substituting the covers 42 and 44 for the cover 136.

A number of alternative embodiments of an industrial process transmitter are possible according to the present invention. FIG. 14 is an exploded perspective view of an alternative embodiment of an industrial process transmitter 20' during assembly, and FIG. 15 is a perspective view of the industrial process transmitter 20'. In the illustrated embodiment, a housing chassis 50' is integrally formed with a neck 48'. The neck 48' and the housing chassis 50' can be die cast together from aluminum as a unitary structure. In other respects, the housing chassis 50' and the neck 48' are similar to the housing chassis 50 and the neck 48 described above.

A housing skin 52' can be formed from a relatively flat sheet of stainless steel having an arithmetic average surface roughness of approximately 32 Ra or smoother, with a neck feature 52N formed thereupon. The neck feature 52N can be a generally cylindrical formation with a central opening that has a shape corresponding to that of the neck 48'. The neck feature 52N can be created using a drawing operation, or any other suitable technique. The housing skin 52' is then positioned about the housing chassis 50'. The neck 48' is inserted at least partially into the neck feature 52N, such that the neck feature 52N generally surrounds and covers the neck 48'. The housing skin 52' is wrapped around the housing chassis 50' with opposite first and second ends 52X and 52Y of the housing skin 52' positioned adjacent to one another. As shown in FIG. 15, a weld joint 300 is made between the adjacent first and second ends 52X and 52Y of the housing skin 52', forming a hermetic seal. The weld joint 300 can be made using tungsten inert gas (TIG) welding, laser welding, or any other suitable process. Opposite ends of the housing skin 52' are rolled to form lips 82' and 84', and a distal end of the neck feature 52N is rolled to form a lip 302. The lips 82', 84' and 302 each help to secure the housing skin 52' to the housing chassis 50'.

Figure 16:
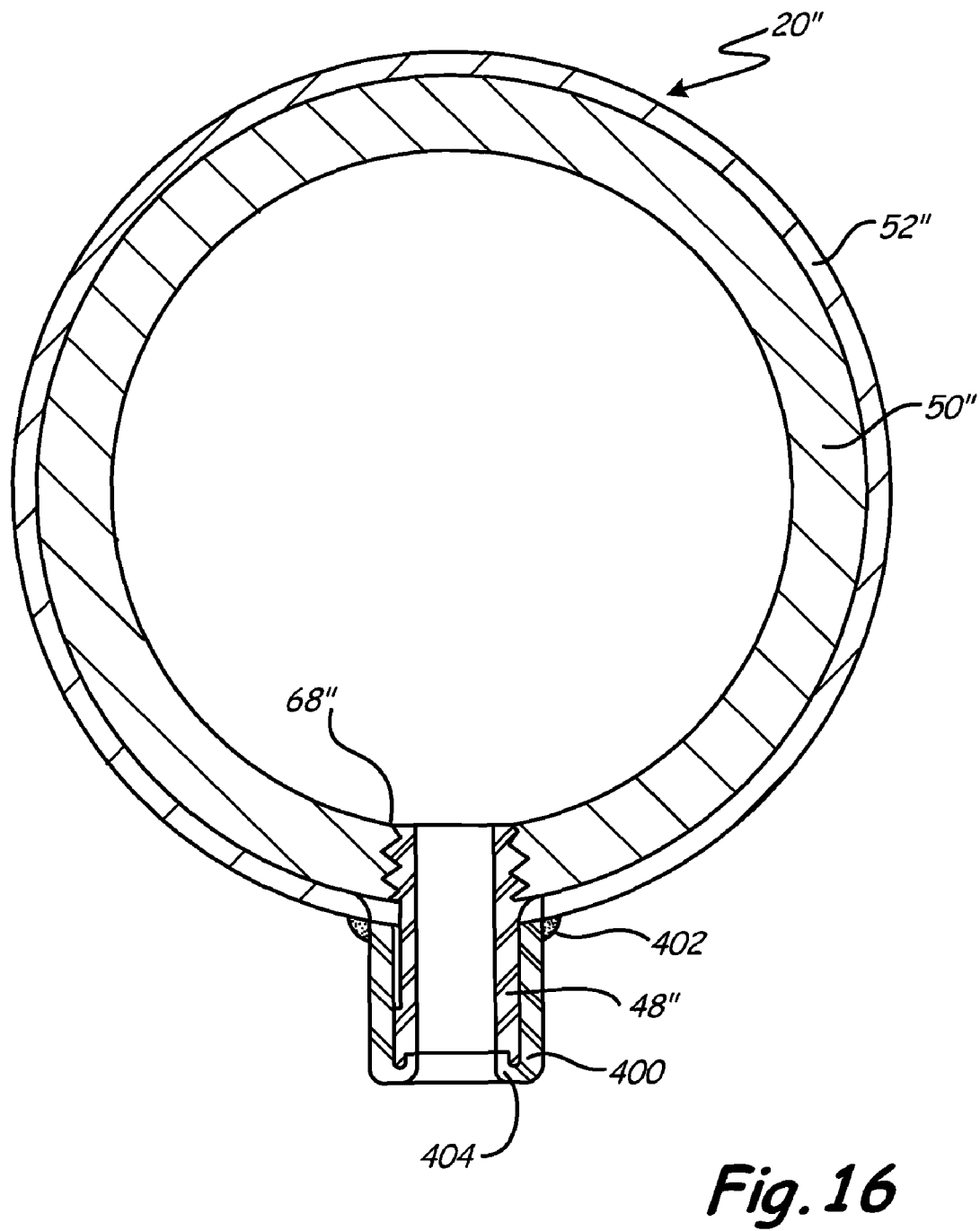
FIG. 16 is a cross-sectional view of another alternative embodiment of an industrial process transmitter according to the present invention.

FIG. 16 is a cross-sectional view of another alternative embodiment of an industrial process transmitter 20". In the illustrated embodiment, a housing chassis 50" is provided about which a housing skin 52" is positioned. The housing chassis 50" and the housing skin 52" can be configured similar to the housing chassis 50 and the housing skin 52 described above. An opening 68" in the housing chassis 50" is threaded, and a generally cylindrical neck chassis 48" is threadably engaged to the opening 68". The neck chassis 48" can be made of aluminum or another suitable material. A neck skin 400, which can be made of stainless steel having an arithmetic average surface roughness of approximately 32 Ra or smoother, is positioned about the neck chassis 48". A weld joint 402 is formed between the neck skin 400 and the housing skin 52", forming a hermetic seal. The weld joint 402 can be made using tungsten inert gas (TIG) welding, laser welding, or any other suitable process. A lip 404 is formed at a distal end of the neck skin 400 to help secure the neck skin 400 to the neck chassis 48".

It will be recognized that the present invention provides numerous advantages and benefits. For example, the use of an industrial process transmitter chassis made of a material like aluminum allows for relatively simple and inexpensive die casting techniques to be used with relatively little post-casting machining required due to the configuration of support members on the chassis. Moreover, the use of skins made of a material like stainless steel that covers the chassis allows for relatively good corrosion resistance and hygienic application performance, as well as helping to limit an overall mass of the industrial process transmitter. A skin and chassis industrial process transmitter housing assembly according to the present invention helps to reduce cost and complexity associated with solid stainless steel housings made using investment casting or extensive machining. Additional features and benefits will be appreciated be those of ordinary skill in the art in view of the present disclosure.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An industrial process transmitter apparatus comprising:
   a housing chassis comprising a first metallic material, wherein the housing chassis comprises:
      a substantially cylindrical body portion;
      a first circumferentially extending support member located at or near a first end of the body portion of the housing chassis, the first circumferentially extending support member extending radially outward from the substantially cylindrical body portion; and
      a second circumferentially extending support member located at or near a second end of the body portion of the housing chassis that is opposite the first end, the second circumferentially extending support member extending radially outward from the substantially cylindrical body portion; and
   a housing skin comprising a second metallic material that is different from the first metallic material, the housing skin fitted over the housing chassis and in physical contact with both the first and second circumferentially extending support members of the housing chassis, wherein the housing skin is spaced from the housing chassis in between the first and second circumferentially extending support members.

2. The apparatus of claim 1 and further comprising:
   at least one O-ring in sealing engagement between the housing skin and the housing chassis, wherein each O-ring is positioned at least partially within a seal recess formed in either the first circumferentially extending support member or the second circumferentially extending support member.

3. The apparatus of claim 1, wherein the first metallic material comprises aluminum, and wherein the second metallic material comprises stainless steel.

4. The apparatus of claim 1, wherein an exterior surface of the housing skin has an arithmetic average surface roughness of approximately 32 Ra or smoother.

5. The apparatus of claim 1, wherein the housing chassis further comprises:
   an internal wall, wherein the internal wall separates a first compartment and a second compartment; and
   one or more electrical feedthroughs pass through the internal wall between the first and second compartments.

6. The apparatus of claim 5 and further comprising:
   a pressure sensor having circuitry positioned in the first compartment of the housing chassis and operatively connected to at least one of the one or more electrical feedthroughs; and
   additional circuitry positioned in the second compartment and operatively connected to the pressure sensor circuitry via the one or more electrical feedthroughs, wherein the additional circuitry is configured to transmit data from the pressure sensor to a remote location.

7. The apparatus of claim 1 and further comprising:
   an electrical connection conduit, wherein the electrical connection conduit is threaded; and
   an adapter positioned against the housing skin having a substantially cylindrical portion facing away from the housing skin, wherein a portion of the electrical connection conduit extends through the adapter and into an opening in the housing skin.

8. The apparatus of claim 7 and further comprising:
a first weld joint formed between the adapter and the housing skin; and
a second weld joint formed between the adapter and the electrical connection conduit.

9. The apparatus of claim 7, wherein a portion of the housing skin is engaged within threads between the electrical connection conduit and the housing chassis.

10. The apparatus of claim 1 and further comprising:
a neck integrally formed with the housing chassis, the neck comprising the first metallic material,
wherein the housing skin further includes an integral neck portion and a weld joint between first and second housing skin portions, the weld joint located opposite the neck portion, and
wherein the neck is positioned at least partially within the neck portion of the housing skin and an edge of the neck portion is rolled to define a neck lip to secure the neck portion relative to the neck.

11. The apparatus of claim 1 and further comprising:
a neck secured to the housing chassis, the neck comprising the first metallic material;
a neck sleeve comprising stainless steel, wherein the neck is positioned at least partially within the neck sleeve and an edge of the neck sleeve is rolled to define a neck lip to secure the neck sleeve relative to the neck; and
a weld joint formed between the neck sleeve and the housing skin.

12. The apparatus of claim 1 and further comprising:
a cover threadably engaged to the housing chassis; and
an O-ring in sealing engagement between the cover and the housing skin.

13. The apparatus of claim 12, the cover comprising:
a cover chassis comprising the first metallic material, the cover chassis defining threads and a circumferentially extending cover support member located adjacent to the threads; and
a cover skin comprising stainless steel, the cover skin fitted over the cover chassis and in physical contact with the circumferentially extending cover support member of the cover chassis, wherein the cover skin has a rolled lip to secure the cover skin to the cover chassis adjacent to the circumferentially extending cover support member.

14. The apparatus of claim 1, wherein the housing skin has a first rolled lip to secure the housing skin to the housing chassis adjacent to the first circumferentially extending support member and a second rolled lip to secure the housing skin to the housing chassis adjacent to the second circumferentially extending support member.

15. A method for making an industrial process transmitter, the method comprising:
casting a housing chassis from a first metallic material;
machining first and second circumferentially extending exterior portions of opposite ends of the housing chassis;
providing a housing skin comprising a second metallic material;
fitting the housing skin over the housing chassis, wherein the housing skin is in physical contact with both the first and second circumferentially extending exterior portions of the housing chassis; and
rolling opposite edges of the housing skin to form lips to secure the housing skin to the housing chassis.

16. The method of claim 15, wherein the first metallic material comprises aluminum, and wherein the housing chassis is die cast.

17. The method of claim 15, wherein the housing skin is substantially cylindrically shaped, and wherein the housing skin is slid over the housing chassis in an axial direction during the fitting step.

18. The method of claim 15, wherein the step of fitting the housing skin over the housing chassis comprises shrink fitting.

19. The method of claim 15 and further comprising:
creating one or more openings in the housing skin.

20. The method of claim 15 and further comprising:
positioning an at least partially saddle-shaped adapter between the housing skin and a conduit; and
threadably attaching the conduit to the housing chassis, wherein a portion of the conduit extends through the adapter and one of the openings in the housing skin.

21. The method of claim 15, wherein a portion of the housing skin is deflected into a threaded engagement formed between the conduit and the housing chassis by the step of threadably attaching the conduit to the housing chassis.

22. The method of claim 15 and further comprising:
positioning an at least partially saddle-shaped adapter between the housing skin and a neck, wherein the neck and the adapter each comprise stainless steel;
threadably attaching the neck to the housing chassis, wherein a portion of the neck extends through the adapter and one of the openings in the housing skin;
welding the adapter to the housing skin; and
welding the adapter to the neck.

23. The method of claim 15 and further comprising:
threadably attaching a neck to the housing chassis, wherein a portion of the neck extends through one of the openings in the housing skin;
positioning a neck skin comprising stainless steel around the neck
welding the neck skin to the housing skin; and
rolling an edge of the neck skin to form a neck skin lip to secure the neck skin relative to the neck.

24. The method of claim 15 and further comprising:
providing a threaded cover;
forming threads on the housing chassis;
positioning a seal between the cover and the skin; and
engaging the threaded cover to the threads on the housing chassis such that the seal is in sealing engagement between the cover and one of the lips of the skin.

25. The method of claim 15 and further comprising:
casting a cover chassis from the first metallic material;
providing a cover skin made of stainless steel;
fitting the cover skin over the cover chassis;
rolling an edge of the cover skin to secure the cover skin to the chassis; and
threadably engaging the cover chassis to the housing chassis.

26. The method of claim 15, wherein the housing chassis includes an integrally cast neck extending from a substantially cylindrical chassis body, the step of providing a housing skin comprising:
providing a substantially flat sheet of stainless steel;
drawing a substantially cylindrical neck hole from a portion of the substantially flat sheet;
positioning the neck of the housing chassis within the neck hole;
wrapping the substantially flat sheet about the substantially cylindrical chassis body; and
welding ends of the wrapped sheet together.

27. An industrial process transmitter apparatus comprising:
- a housing chassis comprising aluminum, wherein the housing chassis defines:
  - a substantially cylindrical body portion; and
  - an internal wall, wherein the internal wall separates a first compartment and a second compartment;
- a housing skin comprising stainless steel, the housing skin fitted over the housing chassis and in physical contact with at least portions of the housing chassis, wherein the housing skin has a first rolled lip to secure the housing skin to the housing chassis adjacent to a first end and a second rolled lip to secure the housing skin to the housing chassis adjacent to and opposite second end;
- a cover threadably engaged to the housing chassis;
- an O-ring in sealing engagement between the cover and the housing skin;
- one or more electrical feedthroughs pass through the internal wall between the first and second compartments of the housing chassis;
- a sensor having circuitry positioned in the first compartment of the housing chassis and operatively connected to at least one of the one or more electrical feedthroughs; and
- additional circuitry positioned in the second compartment and operatively connected to the sensor circuitry via the one or more electrical feedthroughs, wherein the additional circuitry is configured to transmit sensor data to a remote location.

28. The apparatus of claim 27, the cover comprising:
- a cover chassis comprising aluminum, the cover chassis defining threads and a circumferentially extending cover support member located adjacent to the threads; and
- a cover skin comprising stainless steel, the cover skin fitted over the cover chassis and in physical contact with the circumferentially extending cover support member of the cover chassis, wherein the cover skin has a rolled lip to secure the cover skin to the cover chassis adjacent to the circumferentially extending cover support member.

29. The apparatus of claim 27, wherein the housing chassis comprises:
- a substantially cylindrical body portion;
- a first circumferentially extending support member located at or near a first end of the body portion of the housing chassis, the first circumferentially extending support member extending radially outward from the substantially cylindrical body portion; and
- a second circumferentially extending support member located at or near a second end of the body portion of the housing chassis that is opposite the first end, the second circumferentially extending support member extending radially outward from the substantially cylindrical body portion,
- wherein the housing skin is in physical contact with both the first and second circumferentially extending support members of the housing chassis, and
- wherein the housing skin is spaced from the housing chassis at the one or more circumferentially extending recesses.

30. An industrial process transmitter comprising:
- a housing including a substantially cylindrical body portion;
- a skin secured to the housing, the skin configured to cover at least a portion of the housing;
- a sensor positioned at least partially within the housing; and
- an electronics assembly located within the housing and electrically connected to the sensor.

31. The industrial process transmitter of claim 30, wherein the skin comprises stainless steel having an arithmetic average surface roughness of approximately 32 Ra or smoother.

* * * * *